(12) United States Patent
Caldwell et al.

(10) Patent No.: US 8,331,507 B2
(45) Date of Patent: Dec. 11, 2012

(54) MULTI-CHANNEL RECEIVER DEVICE

(75) Inventors: Richard John Caldwell, Compton (GB); Robert Fifield, Gurnard (GB)

(73) Assignee: NXP B.V., Eindhoven (NL)

( * ) Notice: Subject to any disclaimer, the term of this patent is extended or adjusted under 35 U.S.C. 154(b) by 313 days.

(21) Appl. No.: 12/864,084

(22) PCT Filed: Jan. 28, 2009

(86) PCT No.: PCT/IB2009/050340
§ 371 (c)(1),
(2), (4) Date: Jul. 22, 2010

(87) PCT Pub. No.: WO2009/095863
PCT Pub. Date: Aug. 6, 2009

(65) Prior Publication Data
US 2010/0310018 A1    Dec. 9, 2010

(30) Foreign Application Priority Data
Jan. 29, 2008  (EP) .................... 08101042

(51) Int. Cl.
*H03D 1/04*  (2006.01)
*H03D 1/06*  (2006.01)
*H03K 5/01*  (2006.01)
*H03K 6/04*  (2006.01)
*H04B 1/10*  (2006.01)
*H04L 1/00*  (2006.01)
*H04L 25/08*  (2006.01)

(52) U.S. Cl. ........ 375/346; 375/350; 375/349; 375/148; 375/229; 375/232; 455/501; 455/63.1

(58) Field of Classification Search ................ 375/346, 375/350, 349, 148, 229, 232; 455/501, 63.1
See application file for complete search history.

(56) References Cited

U.S. PATENT DOCUMENTS

| 4,821,289 A | 4/1989 | Peile |
| 5,267,266 A | 11/1993 | Chen |
| RE41,107 E * | 2/2010 | Boulanger et al. ............ 375/148 |
| 2006/0126660 A1 | 6/2006 | Denney et al. |

FOREIGN PATENT DOCUMENTS

| EP | 1841080 A1 | 3/2007 |
| WO | 2006/132511 A1 | 12/2006 |

OTHER PUBLICATIONS

International Search Report and Written Opinion, PCT/EP2009/050340, Jan. 28, 2009.

* cited by examiner

*Primary Examiner* — Phuong Phu

(57) ABSTRACT

A device processes signals from a plurality of signal channels that are received in parallel. A channel processing circuit (12*a*,*b*, 14*a*,*b*), applies a series of filtering operations selectively to the signal from a first one of the signal channels. A filter management circuit (18) detects a reception condition from reception of a signal in a second one of the signal channels. The filter management circuit (18) controls application of at least a part of said filtering operations to the signal from the first one the signal channels by the channel processing circuit (12*a*,*b*, 14*a*,*b*), dependent on the detected reception condition. Selected filter operations may be enabled or disabled. Thus, power consumption may be reduced. In an embodiment, the detected reception condition is determined as a by-product of functional reception of another channel. Thus power consumption for the detection of the reception condition is also reduced. From reception of specific types of channels, for example, it may be detected whether the device is indoors or outdoors and filtering of other channels may be adapted accordingly.

12 Claims, 1 Drawing Sheet

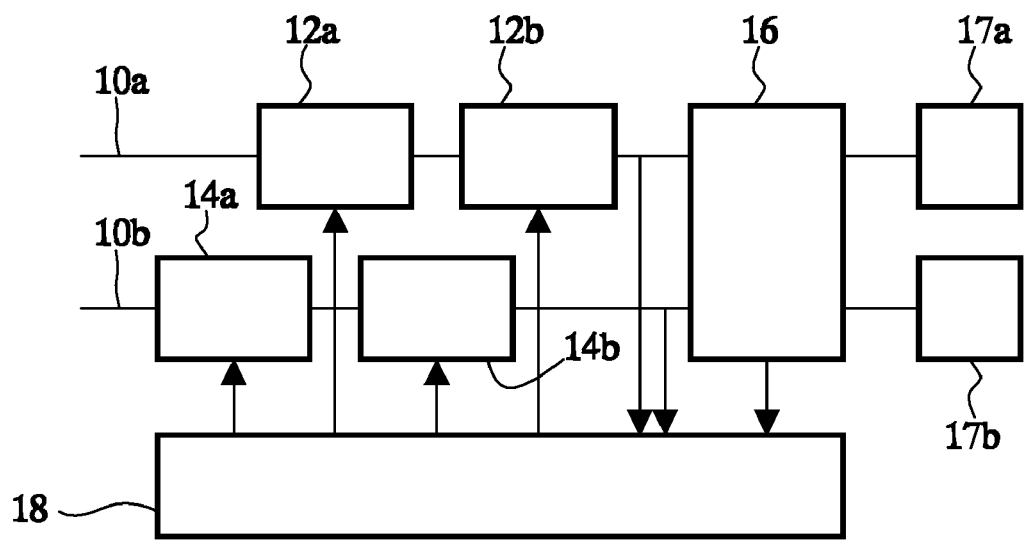

MULTI-CHANNEL RECEIVER DEVICE

FIELD OF THE INVENTION

The invention relates to a device for processing signals from a plurality of signal channels that are received in parallel.

BACKGROUND OF THE INVENTION

W02006/132511, describes a local area network wherein data frames from different transmission channels are combined. A device with a plurality of antennas is used to realize the different channels. U.S. Pat. No. 4,821,289 describes transmission of the same signal in a plurality of channels, in order to counter channel selective fading by processing data from the plurality of channels and selecting data that does not suffer from fading.

Typically, the signals from the channels need to be filtered extensively, to prevent interference other channels. In a band of channels of the same type, e.g. in a GSM band, UMTS band or a WIFI band these other channels could be of the same type, but near the edge of such a band, the other channels could be of a different type. Because the signal power in such other channels may vary widely, and may well exceed the power in the channel that is actually received, extensive filtering is used to prevent interference from such other channels. Digital signal processing may be used, wherein the filter operations of different channels may be performed in parallel or on a time division multiplexing basis.

Excessive power consumption is a problem of devices that process a plurality of parallel channels. Digital signal processing requires power in proportion to the number of signal processing instructions that have to be performed per time unit. Accordingly, power consumption typically increases with the number of channels and in proportion to the number of filter operations that have to be applied to channels individually.

SUMMARY OF THE INVENTION

Among others, it is an object to provide for a reduction of power consumption by a device that is capable of flexible reception of a plurality of signal channels in parallel.

A device according to claim 1 is provided. Herein a filter management circuit detects a reception condition from a signal in a signal channel and controls application of a part of filtering operations that are applied to a signal another signal channel dependent on the detected reception condition. By adapting the filter operation it becomes possible to switch to a mode of filtering that requires less power consumption if reception conditions are easier. In an embodiment control of the filtering operation includes disabling the filtering operations. This maximally reduces power consumption. The filter operation may be a filter operation that increases out of channel suppression, for example by providing for steeper flanks in a frequency dependent transfer function. Another selectively enabled filter operation may involve error correction.

In an embodiment, part of an additional channel reception pipe may be temporarily activated on purpose to determine the reception condition. In another embodiment the reception condition is detected as a side effect of normal reception of a plurality of channels in parallel. This reduces power consumption. The strength of a signal in another functionally received channel may be used to decide the reception condition for example. Also a signal type of the signal from another channel may be detected and use to control the application of a filtering operation. For example, reception of a certain type of signal may be used to distinguish indoors and outdoors reception conditions, and dependent on whether indoors or outdoors conditions are detected different filter operations may be enabled or disabled. Thus, reception of GPS satellite signals may be used to detect outdoors conditions and/or reception of a WIFI signal may be use to detect indoors conditions.

BRIEF DESCRIPTION OF THE DRAWING

These and other advantageous aspects will become apparent from a description of exemplary embodiments, using the following FIGURE FIG. 1 shows a device for receiving a plurality of channels

DETAILED DESCRIPTION OF EXEMPLARY EMBODIMENTS

FIG. 1 shows an example of a device for receiving a plurality of signal channels. The device comprises inputs 10a,b, channel signal processing circuits 12a,b 14a,b, a main processing circuit 16, user input and/or output devices 17a,b and a filter management circuit 18. Inputs 10a,b is coupled to main processing circuit 16 in parallel via respective signal processing "pipes", each pipe comprising a first and second channel signal processing circuit 12a,b 14a,b in series with each other. It should be appreciated that this number is used by way of example. In practice more signal processing circuit 12a,b may be used in series in each pipe. Similarly, there may be more than two pipes in parallel. Inputs 10a,b may be coupled to a single input such as an RF antenna (not shown) or optical detector of a fiber (not shown), or to diverse inputs such as a plurality of antenna's (not shown) coupled to a same medium. Main processing circuit 16 is coupled to user input and/or output devices 17a,b and to filter management circuit 18. Filter management circuit 18 has outputs coupled to control inputs of channel signal processing circuits 12a,b 14a,b in the signal processing pipes. Outputs of the pipes are also coupled to filter management circuit 18. By way of example the inputs to main processing circuit 16 are coupled to filter management circuit 18, but other tap points from the pipes may be used.

In one embodiment the various components of the device that are shown as connected blocks in the figure are implemented as respective circuits, for example sub-circuits of an integrated circuit, or circuits in different integrated circuits. The various components may be circuit designed specifically for their function in the device, or they may be programmable circuits, storing a program of instructions to perform that function. In another embodiment, part or all of the components may be implemented using one or more shared programmable circuits, which implement the functions of respective components successively, by executing programs of instructions for these functions and storing the relevant input and output signals for each function when other functions are executed.

Thus for example, corresponding processing circuits in a plurality of pipes and/or a plurality of processing circuits 12a,b, 14a,b in a pipe could be implemented with a shared programmable circuit and be executed on a time-sharing basis. Similarly the functions of main processing circuit 16 and filter management circuit 18 could be executed by a shared programmable processor. As yet another alternative part or all of the channel signal processing circuits 12a,b 14a,b may be analog circuits that process channel signals in analog form.

In operation, the device may operate with a variable number of active pipes. In a first mode of operation only a single channel may be received, for example a channel a mobile telephone signal, such as a GSM mobile telephone signal, a wireless television signal, a single band wireless data signal, a GPS signal etc. In modes of a second type, a plurality of channels may be received in parallel. In the modes of the second type two of the pipes of signal processing circuits 12a,b 14a,b need to be active in parallel. In other types of mode more pipes may be active.

Main processing circuit 16 determines the relevant mode and activates processing operations needed for the active signal or signals involved in the selected mode of operation. Main processing circuit 16 transmits information to filter management circuit 18 to indicate the type signals that will have to be processed by the pipes of signal processing circuits 12a,b 14a,b. Filter management circuit 18 controls the signal processing circuits 12a,b 14a,b to perform the selected operations.

Filter management circuit 18 keeps all signal processing circuits 12a,b 14a,b in a pipe deactivated when that pipe is not used. Similarly, when a plurality of pipes is not used, the signal processing circuits 12a,b 14a,b in the pipes of that plurality are deactivated. Deactivation may be realized by supplying a disable signal to the signal processing circuits 12a,b 14a,b, by disabling their clocks and/or by cutting off their power supply etc. When implemented by executing a program on a programmable processor, execution of the relevant program may be skipped. In this way, power consumption by unused signal processing circuits 12a,b 14a,b is avoided.

Filter management circuit 18 also controls signal processing circuits 12a,b 14a,b within one or more active pipes. When it is expected that less filtering will suffice to provide a suitable received signal to main processing circuit 16, filter management circuit 18 may control part of the signal processing circuits 12a,b 14a,b to pass signals from their input to their output without processing and deactivate the relevant signal processing circuit otherwise. In this way, power consumption in the pipe is reduced.

Filter management circuit 18 bases the decision to deactivate a signal processing circuit 12a,b 14a,b in an active pipe on a prediction of interfering signals that may affect reception of the signal in the active pipe.

In one embodiment filter management circuit 18 obtains such a prediction by first using an identification of a first signal channel that is received by a pipe, to identify one or more further signal channels that could interfere with a signal from the first signal channel, absent the filter operations of signal processing circuits 12a,b 14a,b. This may be done for example by identifying channels that are adjacent to the channel received in the active pipe. Next, in this embodiment, filter management circuit 18 temporarily activates one or more unused pipes to receive a signal or signals from the identified further signal channels (temporarily activating may involve one time activation after tuning to the first signal channel followed by deactivation, or periodic activation separated by time intervals of deactivation, e.g. during one second or longer time intervals). From the output of the pipes filter management circuit 18 determines whether a signal or signals is or are detected and/or a detected strength of the signal or signals. Subsequently, dependent on the detection and/or detected strength, filter management circuit 18 makes a decision to activate or deactivate a signal processing circuit 12a,b 14a,b for processing the signal in the first signal channel. For example, a filter operation may be activated if the detected strength is above a predetermined threshold level.

In a further embodiment, filter management circuit 18 temporarily activates only part of an unused pipe to receive a signal from the identified further signal channel. Part of the unused pipe may suffice when the unused pipe is not used to perform full decoding, but only for detection and/or the determination of detected strength. A disadvantage of this type of embodiment is that it requires additional power consumption, due to the activation of the one or more additional pipes. Also, no detection is possible when all pipes are used for producing inputs of main processing circuit 16.

In another embodiment filter management circuit 18 gleans a prediction of a possible amount of interference from one or more signals that are functionally received, i.e. received for producing an input to main processing circuit 16. From these signals it may be detected for example whether the device is used indoors or outdoors and/or whether a strong channel is present near a received channel.

For example, when the device functionally receives signals from a plurality of channels in different pipes, filter management circuit 18 may be configured to detect whether these channels are adjacent and, if so, filter management circuit 18 may determine the strength of the signals from these channels and by comparing the strength with a threshold filter management circuit 18 may determine whether or not specific filter operations against adjacent channel interference are needed or not in a pipe. If not, filter management circuit 18 disables these filter operations in that pipe.

As another example filter management circuit 18 may be configured to determine a type identification of a functional signal that is received in a first pipe. Filter management circuit 18 may be configured to determine from the type that the functional signal is part of a plurality of signals of comparable strength in a set of channels. If so, and when at least one of the set of channels is adjacent to the channel received in a second pipe, filter management circuit 18 may compare the strength of the signal in the adjacent channel from the strength of the functional signal from the first pipe and compare this strength with a threshold. From this comparison, filter management circuit 18 may determine whether or not specific filter operations against adjacent channel interference are needed or not. If not, filter management circuit 18 disables these filter operations.

As another example, when the device operates to receive signals from one or more GPS satellites (Global Positioning System), or from more than a threshold number (e.g. two) of such satellites, it may be inferred that the device receives signals outdoors. Accordingly filter management circuit 18 may be configured to disable predetermined filter operations that are specific for processing of indoor signals in response to detection that a pipe receives a predetermined type of signal that is typical for outdoors reception. For example, filter management circuit 18 may disable part of multi-path transmission equalization in this case or enable this part when such outdoors signals are not received. As another example, filter management circuit 18 may enable anti-interference filters against predetermined "outdoors" signals (e.g. UMTS) when such outdoors signals are received or these filters may be disabled when no such outdoors signals are received.

As another example, when the device operates to receive signals from one or more WIFI channels, or from more than a threshold number (e.g. two) of such channels, it may be inferred that the device receives signals indoors. Accordingly filter management circuit 18 may be configured to disable predetermined filter operations that are specific for processing of outdoor signals in response to detection that a pipe receives a predetermined type of signal that is typical for indoors reception. For example, filter management circuit 18 may enable filtering of interfering part of multi-path transmission equalization in this case, or this part may be disabled if no WIFI channels are received. As another example, filter management circuit 18 may disable anti-interference filters against predetermined "outdoors" signals (e.g. UMTS) when such indoors signals are received and these filters may be enabled when such indoors signals are not received.

As another example, filter management circuit 18 may treat reception of a signal from an optical fiber input or a wired connection as an indication of indoors reception with concomitant signal processing.

In addition to, or instead of, enabling/disabling filter operations other operations, like automatic gain control, error detection or correction etc. may be enabled or disabled. Thus, for example dependent on the occurrence of indoors or outdoors conditions, a specific error correction operation may be activated or deactivated. When filter management circuit 18 controls such operations it could more properly speaking be called a channel signal processing management circuit, but the term filter management circuit is used with the understanding that "filtering" covers all transformations of the signal that reduce or remove effects that deform the signal.

Typically, only part of channel signal processing circuits 12*a,b* 14*a,b* in a pipe is deactivated in response to detection of reception conditions. Thus for example, a first channel signal processing circuit 12*a* in a pipe may be kept active under all circumstances when a signal is received and a second channel signal processing circuit 12*b* may be disabled dependent on reception condition. In this way a basic filtering operation may be performed always, whereas an additional signal processing is optionally performed. Such an additional signal processing operation typically is an operation that reduces the effect of interference signals outside than the received signal channel without necessarily functionally changing the signal in the received signal channel. The additional signal processing operation may be frequency band filtering with increased out of band rejection compared to the basic filter operation, error correction etc.

Although embodiments have been described wherein a filter operation is completely enabled or disabled dependent on the predicted signal environment, alternatively the filter operation may be merely adapted, for example by using filter coefficients and or signals with fewer bits and/or by using fewer iterations in order to save power consumption.

As mentioned, the various components of FIG. 1 need not be strictly separate. Thus for example, many or all of the functions of filter management circuit 18 may be implemented in main processing circuit 16, which may be a programmable processor programmed to perform the relevant functions. Similarly, the pipes may be implemented using a programmable signal processor circuit that performs instructions to implement the filter operations, in which case filter operations may be disabled by switching to modes wherein the relevant instructions are not executed.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A device for processing signals from a plurality of signal channels that are received in parallel, the device comprising:
a channel processing circuit, configured to apply a series of filtering operations selectively to a signal from a first one of the signal channels;
a filter management circuit configured to detect a reception condition from reception of a signal in a second one of the signal channels and to control an application of at least a part of said filtering operations to the signal from the first one the signal channels by the channel processing circuit, dependent on the detected reception condition;
wherein the filter management circuit is configured to select between enabling and disabling said part of the filtering operations, while keeping a remainder of the filtering operations enabled, dependent on the detected reception condition.

2. A device according to claim 1, wherein said part of the filtering operations comprises a filter operation that increases out of channel suppression compared to a remainder of the filtering operations applied to the signal from the first one of the signal channels.

3. A device according to claim 1, further comprising a main processing circuit configured to process the signals from said plurality of signal channels concurrently, and wherein the filter management circuit is configured to glean information about the reception condition from the signals from the plurality of signal channels as a by-product when the signals from the plurality of signal channels are received for the main processing circuit.

4. A device according to claim 3, wherein the filter management circuit is configured to determine a signal strength of a further signal in said second one of the channels that is adjacent to the first one of the channels and to control the application of said at least part of the filtering operations dependent on said signal strength.

5. A device according to claim 3, wherein the filter management circuit is configured to detect a signal type of the signal from the second one of the signal channels and to control the application of the at least part of the filtering operation dependent on said detected signal type.

6. A device according to claim 1, wherein the channel processing circuit comprises a plurality of parallel signal processing pipes for processing respective channels, a first one of the signal processing pipes being configured to process the signal from the first one of the signal channels, the filter management circuit being configured to activate a second one of the signal processing pipes temporarily to determine the detected reception condition contemporaneously with operation of the first one of the signal processing pipes.

7. A device according to claim 1, wherein the channel processing circuit comprises a plurality of parallel signal processing pipes, each for processing a respective one of the signal channels, each signal processing pipe comprising a plurality of filtering units, the filter management circuit being configured to select between enabling and disabling respective ones of the filter units selectively, dependent on the detected reception condition.

8. A device for processing signals from a plurality of signal channels that are received in parallel, the device comprising:

a channel processing circuit, configured to apply a series of filtering operations selectively to a signal from a first one of the signal channels;

a filter management circuit configured to detect a reception condition from reception of a signal in a second one of the signal channels and to control an application of at least a part of said filtering operations to the signal from the first one the signal channels by the channel processing circuit, dependent on the detected reception condition;

a main processing circuit configured to process the signals from said plurality of signal channels concurrently, and wherein the filter management circuit is configured to glean information about the reception condition from the signals from the plurality of signal channels as a by-product when the signals from the plurality of signal channels are received for the main processing circuit.

9. A device according to claim 8, wherein the filter management circuit is configured to determine a signal strength of a further signal in said second one of the channels that is adjacent to the first one of the channels and to control the application of said at least part of the filtering operations dependent on said signal strength.

10. A device according to claim 8, wherein the filter management circuit is configured to detect a signal type of the signal from the second one of the signal channels and to control the application of the at least part of the filtering operation dependent on said detected signal type.

11. A device for processing signals from a plurality of signal channels that are received in parallel, the device comprising:

a channel processing circuit, configured to apply a series of filtering operations selectively to a signal from a first one of the signal channels;

a filter management circuit configured to detect a reception condition from reception of a signal in a second one of the signal channels and to control an application of at least a part of said filtering operations to the signal from the first one the signal channels by the channel processing circuit, dependent on the detected reception condition;

wherein the channel processing circuit comprises a plurality of parallel signal processing pipes for processing respective channels, a first one of the signal processing pipes being configured to process the signal from the first one of the signal channels, the filter management circuit being configured to activate a second one of the signal processing pipes temporarily to determine the detected reception condition contemporaneously with operation of the first one of the signal processing pipes.

12. A device for processing signals from a plurality of signal channels that are received in parallel, the device comprising:

a channel processing circuit, configured to apply a series of filtering operations selectively to a signal from a first one of the signal channels;

a filter management circuit configured to detect a reception condition from reception of a signal in a second one of the signal channels and to control an application of at least a part of said filtering operations to the signal from the first one the signal channels by the channel processing circuit, dependent on the detected reception condition;

wherein the channel processing circuit comprises a plurality of parallel signal processing pipes, each for processing a respective one of the signal channels, each signal processing pipe comprising a plurality of filtering units, the filter management circuit being configured to select between enabling and disabling respective ones of the filter units selectively, dependent on the detected reception condition.

* * * * *